United States Patent [19]

Giometti

[11] Patent Number: 4,777,836

[45] Date of Patent: Oct. 18, 1988

[54] ENGINE STARTER GEARING

[75] Inventor: Paul F. Giometti, Horseheads, N.Y.

[73] Assignee: Facet Enterprises, Inc., Tulsa, Okla.

[21] Appl. No.: 88,814

[22] Filed: Aug. 24, 1987

Related U.S. Application Data

[63] Continuation-in-part of Ser. No. 907,485, Sep. 15, 1986, Pat. No. 4,715,239.

[51] Int. Cl.[4] ........................ F02N 15/06; F16D 43/24

[52] U.S. Cl. ............................................ 74/6; 74/7 R; 192/103 A; 192/104 R

[58] Field of Search ..................... 74/6, 7 R, 7 A, 7 C; 192/103 A, 104 R, 105 B, 106 R, 114 R

[56] References Cited

U.S. PATENT DOCUMENTS

| | | | |
|---|---|---|---|
| 3,263,509 | 8/1966 | Digby | 74/6 |
| 4,346,615 | 8/1982 | Yoneda et al. | 192/114 X |
| 4,425,812 | 1/1984 | Williams | 192/114 R X |
| 4,611,499 | 9/1986 | Giometti | 74/6 |

*Primary Examiner*—Allan D. Herrmann
*Attorney, Agent, or Firm*—Remy J. VanOphem

[57] ABSTRACT

Centrifugally disengageable engine starter gearing selectively starting an engine having a starting gear. The engine starter gearing includes a power shaft, a sleeve slidably secured to the power shaft, a pinion gear slidably mounted to the power shaft and movable into engagement with the starting gear, a driven clutch member secured to the pinion gear and having an annular or circular recess with an inclined or conical surface therein, a driving clutch member mounted to the sleeve, mutually engageable clutch teeth on the driving and driven clutch members, a barrel housing having an open end and being at least partly fitted over the driving and driven clutch members, an abutment confining the driving and driven clutch members within the housing, a resilient member biasing the driving and driven clutch members into mutual engagement, and a radially inwardly extending shoulder on the driving clutch member adjacent the circular recess. A plurality of centrifugal flyweight members are annularly arranged in the circular recess. Each centrifugal flyweight member has an inclined surface abutting the conical surface of the driven clutch member and operative to displace the driving clutch member in the first axial direction in response to centrifugal force. An elongated hole is provided in each centrifugal flyweight member. A guide pin is provided for each centrifugal flyweight member, which inserts at one end into a hole of the driven clutch member and extends into the elongated hole at the other end for preventing circumferential movement of the plurality of centrifugal flyweight members while permitting radial and axial movement thereof.

8 Claims, 2 Drawing Sheets

ENGINE STARTER GEARING

CROSS-REFERENCE TO RELATED APPLICATION

This application is a continuation-in-part of my co-pending application Ser. No. 907,485, filed on Sept. 15, 1986, now U.S. Pat. No. 4,715,239.

BACKGROUND OF THE INVENTION

1. Field of the Invention

The present invention relates to engine starter gearing for an engine and more particularly to engine starter gearing of a positive shift type, including a dentil clutch to provide driving and overrunning features and further including provisions for effecting the automatic separation of the clutch teeth after the engine becomes self-running.

2. Description of the Prior Art

The present invention, like the invention described in my U.S. Pat. No. 4,611,499 is an improvement over the starter gearing system described in U.S. Pat. No. 3,263,509 entitled "Engine Starter Drive" and issued Aug. 2, 1966, to James Digby. The above referenced patent disclosed an engine starter gearing using centrifugal weights and a conical thrust washer for separating dentil clutch teeth after engine start-up to prevent long periods of clutch overrunning and accompanying deleterious wear on the clutch teeth. In Digby, a circular recess is provided in one end of the driven clutch member facing the driving clutch member. An annular thrust washer is fitted in the recess and abuts the driving clutch member. A conical surface is provided on the annular thrust washer facing the driven clutch member. A plurality of centrifugal flyweight members are also provided in the circular recess. The centrifugal flyweight members are provided with an inclined surface cooperating with the conical surface in the annular thrust washer, such that, when an overrunning condition occurs, the centrifugal flyweight members move outwardly and the inclined surface engages the conical surface of the annular thrust washer so as to bias the driving clutch member away from the driven clutch member. The centrifugal flyweight members are prevented from axial or rotational movement by pins extending through suitable bores in the driven clutch member and the centrifugal weight member.

While the engine starter gearing of Digby has been satisfactory in operation, it is difficult and expensive to assemble. This is true because the assembly of the engine starter gearing of Digby was made difficult and expensive by virtue of the fact that the annular thrust washer or thrust ring, the plurality of movable pins and plurality of centrifugal flyweight members must all be somehow maintained in position relative to the driven clutch member during the assembly of the driven clutch member to the driving clutch member.

What is needed, therefore, is an improved engine starter gearing using a centrifugal flyweight clutch separator which is easier and less expensive to assemble and which eliminates the need for an annular thrust washer by combining its function with another element of the engine starter gearing.

SUMMARY OF THE PRESENT INVENTION

The present invention provides novel and improved engine starter gearing. The engine starter gearing of the present invention utilizes a conical surface formed in one end of a driven clutch member which slidably engages with the inclined surface of the centrifugal flyweight members, thus eliminating the need of a thrust ring.

In particular, the engine starter gearing of the present invention provides a power shaft, a sleeve slidably secured to the power shaft, and helical splines on one extremity of the sleeve. A pinion gear is slidably journalled to the power shaft for axial movement relative thereto, the pinion gear being adapted for movement into and out of engagement with the starting gear of the engine to be started. A driven clutch member is secured to the pinion gear for movement therewith. A circular recess is formed in the driven clutch member. A driving clutch member is slidably mounted on the helical splines of the sleeve. The driving and driven clutch members have complementary mutually engageable inclined teeth for transmitting torque therebetween in one direction of relative rotation.

A barrel housing is slidably supported on the sleeve and is provided with an open end such that the barrel housing may be fitted over the driving and driven clutch members. The driving and driven clutch members are contained within the barrel housing by abutment means. A resilient member is disposed within the barrel housing and abuts the driving clutch member so as to bias the driving and driven clutch members into mutual engagement. A radially inwardly extending shoulder is formed on the driving clutch member adjacent the circular recess formed in the driven clutch member.

A plurality of centrifugal flyweight members are annularly arranged in the circular recess. The plurality of centrifugal flyweight members each have an inclined surface abutting an inner conical surface formed in that end of the circular recess of the driven clutch member which is farthest from the pinion gear. This eliminates the need for a thrust ring as required in the aforesaid co-pending application Ser. No. 575,199. The plurality of centrifugal flyweight members are operative to displace the driving clutch member in a first axial direction in response to centrifugal force. Each centrifugal flyweight member of the plurality of centrifugal flyweight members has a radially oriented elongated hole. A guide pin attached to the driven clutch member extends into the elongated hole of each centrifugal flyweight member in order to prevent circumferential movement of each of the centrifugal flyweight members, while permitting radial and axial moveent thereof. In the preferred embodiment of the structure of the present invention, each of the centrifugal flyweight members includes a portion extending longitudinally from the inclined surface into the circular recess.

A primary object of the present invention is to provide engine starter gearing which has a reduced number of components and which, thereby, is easy to assemble. The present invention accomplishes this object by providing a plurality of centrifugal flyweight members, each of which has an inclined surface which is directly engageable with the inner conical surface of the driven clutch member attached to the starter gearing pinion so as to reduce the number of components which must be secured together during assembly.

These and many other objects, features and advantages of the present invention will become apparent to those skilled in the art when the following detailed description of the preferred embodiment is read together with the drawings appended hereto.

DETAILED DESCRIPTION OF THE PREFERRED EMBODIMENT

Figure 1:
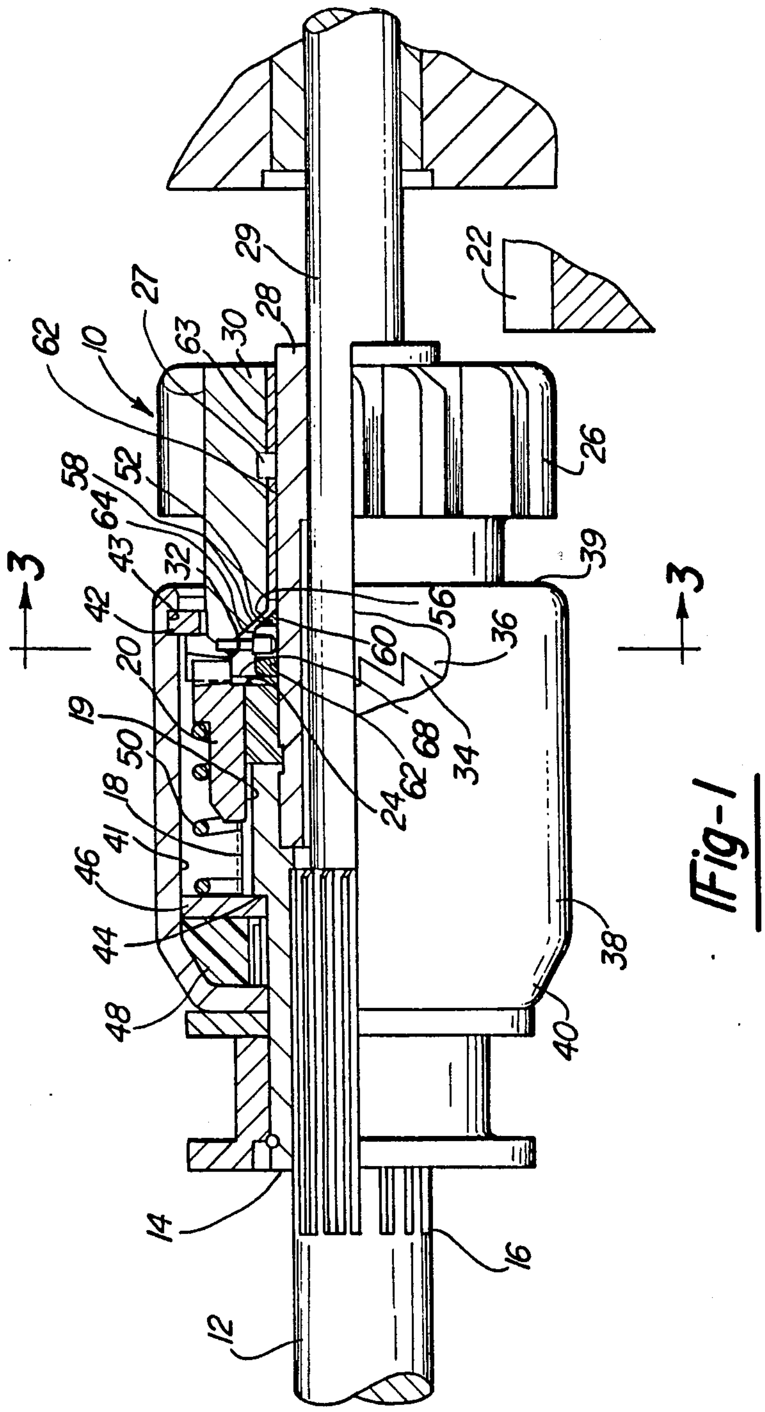
FIG. 1 is a side elevational view, partly broken away and partly in section, of the preferred embodiment of structure for an engine starter gearing according to the present invention.

Referring now to the drawing and more particularly to FIG. 1 thereof, there is illustrated a starter drive 10 for an engine, not shown, mounted to the power shaft 12 of a starting motor, also not shown. The starter drive 10 includes an axially extending sleeve 14 connected to the power shaft 12 by straight splines 16. The axially extending sleeve 14 is, therefore, axially movable relative to the power shaft 12 but may not rotate relative thereto. The external surface of the right-hand extremity of the axially extending sleeve 14, as illustrated, has external helical splines 18 formed thereon. A driving clutch member 20 has internal helical splines 19 threaded onto the external helical splines 18 of the axially extending sleeve 14. The driving clutch member 20 is, therefore, movable towards and away from a starting gear 22 of the engine to be started. The driving clutch member 20 is illustrated in its engaged position in the drawing. In the engaged position, the driving clutch member 20 projects past the right end of the axially extending sleeve 14. The rightmost edge, as illustrated, of the internal helical splines 19 of the driving clutch member 20 forms a radially inwardly extending shoulder 24, for a purpose to be described later.

A sleeve 28 is slidably supported on a reduced diameter portion 29 of the power shaft 12. One end of the sleeve 28 is secured to the axially extending sleeve 14. A pinion gear 26 is journalled on a bearing 63 and retained thereon by a retainer 27. The bearing 63, in turn, is slidably mounted on the sleeve 28 thereby permitting the pinion gear 26 to be axially movable relative to the power shaft 12. The pinion gear 26 is movable into and out of engagement with the starting gear 22 of the engine to be started. A driven clutch member 30 is integrally formed with the pinion gear 26 and extends therefrom towards the driving clutch member 20. An annular or circular recess 32 is provided in the driven clutch member 30 adjacent the driving clutch member 20. The circular recess 32 cooperates with the sleeve 28 to define an annular channel therebetween.

The adjacent faces of the driving clutch member 20 and driven clutch member 30 are provided with dentil teeth 34 and 36, respectively, which are complementary mutually engageable inclined torque transmitting dentil teeth. The dentil teeth 34 and 36 are of the sawtooth variety to provide a one-way overrunning clutch connection.

A housing 38 having an open end 39 and a closed end 40 is slidably supported at its closed end 40 on an external surface of the axially extending sleeve 14. The housing 38 is barrel shaped and fitted over the driving clutch member 20 and partially over the driven clutch member 30. A lock ring 42 is seated in a groove 43 adjacent the open end 39 of the housing 38. The lock ring 42 has sufficient radial length to engage the driven clutch member 30 to thereby confine the driven clutch member 30 and the driving clutch member 20 within a cavity 41 of the housing 38.

The axially extending sleeve 14 is provided with a radial shoulder 44 in an intermediate location therealong to provide an abutment for a disk or washer 46 slidably journalled on the axially extending sleeve 14. A resiliently yieldable annular member 48, preferably formed of an elastically deformable material, such as rubber, is compressively confined between the disk 46 and the closed end 40 of the housing 38. A resilient spring member 50 is compressively confined within the cavity 41 of the housing 38 between the washer 46 and the driving clutch member 20 to provide a biasing force urging the driving clutch member 20 into engagement with the driven clutch member 30.

A shifting mechanism, not illustrated in the drawing but well known in the art, is provided for moving the starter drive 10 towards and away from the starting gear 22 of the engine.

Figure 3:
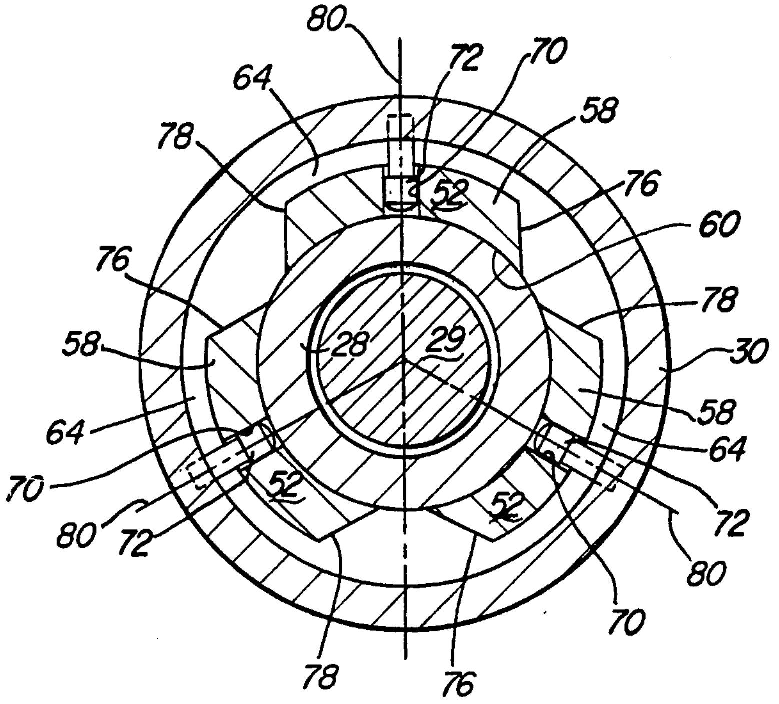

As is shown most clearly in FIG. 3, a plurality of centrifugal flyweight members 52 are fitted within the circular recess 32 in the driven clutch member 30. Each of the centrifugal flyweight members 52 is appropriately dimensioned in relation to the circular recess 32 to allow for sliding movement of the inclined surface 56 along the conical inner surface 58 of the driven clutch member 30. Each of the centrifugal flyweight members 52 has an inner surface 60 engaging an outer surface 62 of the sleeve 28 and an outer surface 64 remote therefrom. Preferably, the inner surface 60 and the outer surface 64 of the centrifugal flyweight members are circular, cylindrically shaped, and concentric.

As indicated above, each of the centrifugal flyweight members 52 is provided with an inclined surface 56 extending inwardly and angularly away from the outer surface 64 towards the inner surface 60 thereof and generally parallel to the conical inner surface 58 of the driven clutch member 30. The inclined surface 56 is slidable relative to the conical inner surface 58 of the driven clutch member 30 so as to separate the dentil teeth 34 and 36, respectively, of the driving clutch member 20 and the driven clutch member 30 during an overrunning condition. The centrifugal flyweight members 52 are also provided with a thrusting surface 66 disposed remote from the inclined surface 56 and extending perpendicular from the inner surface 60. The thrusting surface 66 contacts the surface of a thrust washer 68 adjacent to the circular recess 32, and the thrust washer 68, in turn, engages the radially extending shoulder 24 of the driving clutch member 20. The thrust washer 68, therefore, acts as a radially inward abutment stop during the radial outward motion of the centrifugal flyweight member 52 which results from the rotation of the driven clutch member 30.

Figure 2:
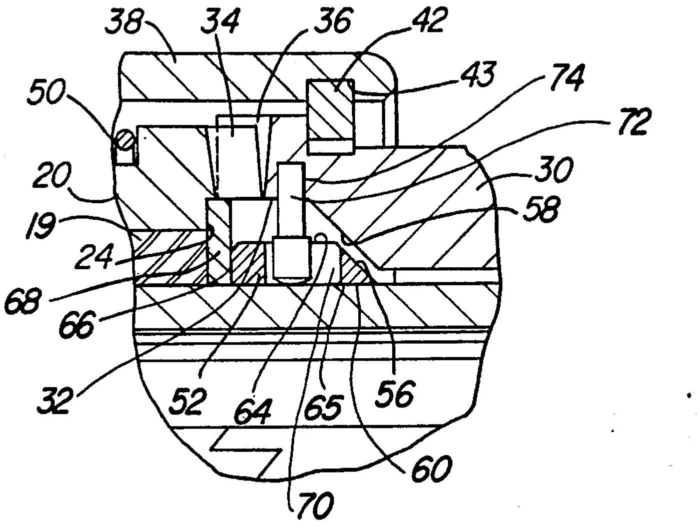
FIG. 2 is an enlarged fragmentary view of the engine starter gearing shown in FIG 1; and, FIG. 3 is a partial cross-sectional view taken along lines 3—3 of FIG. 1 showing components within the annular circular recess.

As shown in FIGS. 2 and 3, each of the centrifugal flyweight members 52 are provided with an elongated hole or slot 70 extending between the outer surface 64 and inner surface 60 and located intermediately between the end 65 of the inclined surface 56 and thrusting surface 66. A guide pin 72 is provided for each centrifugal flyweight member. One end of the guide pin 72 is inserted into a hole 74 in the driven clutch member 30; the other end of the guide pin 72 projects into the elongated hole 70 for guiding radial movement of the centrifugal flyweight member 52 without permitting substantial movement in the circumferential direction.

In operation, when it is desired to crank the engine, the starter drive 10 is shifted to the right via the shifting mechanism, not illustrated, so that the pinion gear 26 engages the starting gear 22. The power shaft 12 is rotated by a starting motor, not illustrated, and transmits torque through the straight splines 16 to the axially extending sleeve 14, and from the helical splines 18 to the driving clutch member 20. The driving clutch member 20 drives the driven clutch member 30 through the dentil teeth 34 and 36. The driven clutch member 30 thereby rotates the pinion gear 26 and the starting gear 22 of the engine.

As the engine fires and becomes self-operating, the starting gear 22 will drive the pinion gear 26 at a speed greater than that of the power shaft 12. The dentil teeth 34 and 36 will slip so that the starting motor is not driven at a high engine speed. In order to protect the dentil teeth 34 and 36 from severe wear due to the rubbing and clashing which would otherwise occur, and further to avoid unnecessary noise, the rapid rotation of the driven clutch member 30 drives the centrifugal flyweight members 52 radially outwardly. The movement of each centrifugal flyweight member 52 within the circular recess 32 is guided by contact between the guide pin 72 and the surfaces of the centrifugal flyweight member on either side of the elongated hole 70, so as to prevent any circumferential motion of the centrifugal flyweight members 52 relative to the driven clutch member 30 other than the desired radial motion.

The outward motion of the centrifugal flyweight members 52 will bring the inclined surface 56 of the centrifugal flyweight members 52 into engagement with the conical inner surface 58 of the driven clutch member 30, urging the flyweight members 52 and the thrust washer 68 to the left against the biasing force of the resilient spring member 50. This motion of the flyweight members 52 is transferred through the thrust washer 68 and the radially inwardly extending shoulder 24 of the axially extending sleeve 14 to the driving clutch member 20, causing a separation of the driving clutch member 20 and the driven clutch member 30.

It will be appreciated by those skilled in the art that the starter drive 10 described above will be easier to assemble than prior art starter drive gearing since it incorporates fewer individual components which must be maintained in a fixed relationship, relative to the driven clutch member 30 during an assembly operation.

Still other advantages of the starter drive 10 of the present invention will be apparent to those skilled in the art.

The above constitutes a detailed description of the best mode contemplated at the time of filing for carrying out the present invention. It will be apparent to those skilled in the art that many variations and modifications may be made from the above described examples without departing from the spirit of the present invention. Such variations and modifications are included within the intended scope of the claims appended hereto.

What is claimed is:

1. An engine starter gearing for selectively starting an engine having a starting gear, said engine starter gearing comprising:

a power shaft;

a sleeve slidably, but non-rotatably, secured to said power shaft, said sleeve having external helical splines formed on one extremity thereof;

a pinion gear slidably journalled to said power shaft for axial movement relative thereto, said pinion gear being movable into and out of engagement with said starting gear of said engine to be started;

a driven clutch member secured to said pinion gear for movement therewith, said driven clutch member having a circular recess formed radially outwardly from said sleeve, said circular recess ending inwardly in said driven clutch member in a conical surface, said conical surface having an incline towards said sleeve;

a driving clutch member slidably mounted on said helical splines of said sleeve, said driving and driven clutch members having complementary mutually engageable inclined teeth for transmitting torque therebetween in one direction of relative rotation;

a barrel housing having an open end, said barrel housing being slidably supported on said sleeve and at least partially spatially encompassing said driving and driven clutch members;

abutment means disposed within said barrel housing adjacent said open end thereof, said abutment means engaging said driven clutch member for confining said driving and driven clutch members within said barrel housing;

resilient means disposed within said barrel housing, said resilient means abutting said driving clutch member, said resilient means further biasing said driving and driven clutch members into mutual engagement;

a radially inwardly extending shoulder formed on said driving clutch member adjacent said circular recess of said driven clutch member;

a plurality of centrifugal flyweight members annularly arranged within said circular recess, each centrifugal flyweight member of said plurality of centrifugal flyweight members having an inclined surface abutting said conical surface of said driven clutch member, said plurality of centrifugal flyweight members being operative to displace said driving clutch member in said first axial direction in response to centrifugal force, said each centrifugal flyweight member further having an elongated hole extending radially therethrough; and a plurality of guide pins connected to said driven clutch member, one guide pin of said plurality of guide pins for each respective centrifugal flyweight member of said plurality of centrifugal flyweight members, each said guide pin extending into said elongated hole of said respective centrifugal flyweight member for guiding said respective centrifugal flyweight member while permitting radial and axial movement thereof in response to centrifugal force.

2. The engine starter gearing of claim 1 wherein said resilient means and said plurality of centrifugal flyweight members apply opposed forces to said driving clutch member.

3. The engine starter gearing of claim 1 further comprising stop means movable with said pinion gear and said driven clutch member to provide a radially inward abutment stop for said plurality of centrifugal flyweight members.

4. The engine starter gearing of claim 1 wherein said plurality of centrifugal flyweight members comprises exactly three centrifugal flyweight members.

5. The engine starter gearing of claim 1 wherein said stop means is a thrust washer, further wherein each centrifugal flyweight member of said plurality of centrifugal flyweight members comprises:

an inner surface disposed adjacent said sleeve, said inner surface having a partial circular cylindrical shape;

an outer surface disposed remote from said inner surface; said inclined surface on said each centrifugal flyweight member extending inwardly and angularly away from said outer surface towards said inner surface, said inclined surface being generally parallel to said conical surface in said driven clutch member; and a thrusting surface for thrusting said each centrifugal flyweight member against said thrust washer in response to centrifugal force, said thrusting surface extending between said inner surface and said outer surface remote from said inclined surface, said thrusting surface being perpendicular to each of said inner and outer surfaces and extending therebetween; said each centrifugal flyweight member having an end remote from said thrusting surface; said elongated hole in said each centrifugal flyweight member being at an intermediate position between said thrusting surface and said remote end.

6. The engine starter gearing of claim 5 wherein said outer surface has a partial circular cylindrical shape and is concentric with said inner surface.

7. An engine starter gearing for selectively starting an engine having a starting gear, said engine starter gearing comprising:

a power shaft;

sleeve means slidably, but non-rotatably, secured to said power shaft;

pinion gear means slidably journalled to said power shaft for axial movement into and out of engagement with said starting gear of said engine to be started;

driven clutch member means secured to said pinion gear means for movement therewith, said driven clutch member means having circular recess means, said circular recess means ending in a conical surface means;

driving clutch member means slidably mounted on said sleeve means for transmitting torque to said driven clutch member means in one direction of relative rotation;

barrel housing means slidably supported on said sleeve means for at least partially spatially encompassing said driving clutch member means and said driven clutch member means;

abutment means disposed within said barrel housing means engaging said driven clutch member means for confining said driving clutch member means and said driven clutch member means within said barrel housing means;

resilient means disposed within said barrel housing means, said resilient means abutting said driving clutch member means, said resilient means further biasing said driving clutch member means and driven clutch member means into mutual engagement;

radially inwardly extending shoulder means formed on said driving clutch member means adjacent said circular recess means of said driven clutch member means;

a plurality of centrifugal flyweight members annularly arranged within said circular recess means, each centrifugal flyweight member of said plurality of centrifugal flyweight members having an inclined surface abutting said conical surface means of said driven clutch member means, said plurality of centrifugal flyweight members being operative to displace said driving clutch member means in said first axial direction in response to centrifugal force, said each centrifugal flyweight member further having an elongated hole extending radially therethrough;

a plurality of guide pins connected to said driven clutch member means, one guide pin of said plurality of guide pins for each respective centrifugal flyweight member of said plurality of centrifugal flyweight members, each said guide pin extending into said elongated hole of said respective centrifugal flyweight member for guiding said respective centrifugal flyweight member while permitting radial and axial movement thereof in response to centrifugal force.

8. The engine starter gearing of claim 7 further comprising a thrust washer movable with said pinion gear means and said driven clutch member means to provide a radially inward abutment stop for said plurality of centrifugal flyweight members, wherein each centrifugal flyweight member of said plurality of centrifugal flyweight members comprises:

an inner surface disposed adjacent said sleeve means, said inner surface having a partial circular cylindrical shape;

an outer surface disposed remote from said inner surface; said inclined surface on said each centrifugal flyweight member extending inwardly and angularly away from said outer surface towards said inner surface, said inclined surface being generally parallel to said conical surface means in said driven clutch member means; and a thrusting surface for thrusting said each centrifugal flyweight member against said thrust washer in response to centrifugal force, said thrusting surface extending between said inner surface and said outer surface remote from said inclined surface, said thrusting surface being perpendicular to each of said inner and outer surfaces and extending therebetween; said each centrifugal flyweight member having an end remote from said thrusting surface; said elongated hole in said each centrifugal flyweight member being at an intermediate position between said thrusting surface and said remote end.

* * * * *

UNITED STATES PATENT AND TRADEMARK OFFICE
CERTIFICATE OF CORRECTION

PATENT NO. : 4,777,836

DATED : October 18, 1988

INVENTOR(S) : Paul F. Giometti

It is certified that error appears in the above-identified patent and that said Letters Patent is hereby corrected as shown below:

Column 1, line 21, after "4,611,499" insert a comma ---- , ----.

Column 2, line 50, delete "moveent" and insert ---- movement ----.

Column 3, line 4, after "drawings" insert a colon ---- : ----.

Signed and Sealed this

Ninth Day of May, 1989

*Attest:*

DONALD J. QUIGG

*Attesting Officer*

*Commissioner of Patents and Trademarks*